3,133,053
OPTIMUM PECTIN METHYLATION RATE AND PRODUCT PRODUCED THEREBY
William A. Bender, Bloomfield, N.J., Robert V. MacAllister, Clinton, Iowa, and Boleslaw Sienkiewicz, Pearl River, N.Y., assignors to General Foods Corporation, White Plains, N.Y., a corporation of Delaware
No Drawing. Filed Nov. 27, 1961, Ser. No. 155,205
15 Claims. (Cl. 260—209.5)

This invention relates to methylation of pectin and the production of high methyl ester pectin, that is, pectin which has a high ratio of methyl ester groups to the sum of methyl ester and carboxyl groups. This ratio will be hereinafter expressed as degree of methylation (D.M.) in percentage points.

Pectin as referred to in the present invention includes the acid liquor extract from various cellulose sources of pectin material such as ripe fruits and vegetables, and more commonly the peel of citrus fruits and apple pomace. Pectin as it occurs in such plants is made up of repeating galacturonide units. The carboxyl groups of the units are to varying extents esterified as methyl esters, neutralized as metal salts, or present as free carboxyl groups. The orginal extent of methylation and neutralization of the pectin depends upon the condition of the fruit from which the pectin was obtained. The relative proportions of these groups have a marked effect on the properties and use of pectin in making jellies and jams. The relative amounts of these groups differ with the pectin source, the maturity of the fruit, the season to season variation, as well as the processing conditions existing during pectin manufacture.

It has heretofore been generally recognized that by chemical manipulation the aforementioned groups can be converted from one to another to bring about changes in behavior of the pectin. However, performance of such modified pectin is usually difficult to predict. In the case of pectin preparations in the liquid or powder form to be used in the preparation of jams and jellies with fruit, it is desirable that the pectin produce a jelly or jam of uniform strength with both high and low acid fruits. Oftentimes it occurs that a pectin will provide a jelly of high gel strength with a high acid fruit, such as grape, but will result in a jelly of low strength with a low acid fruit, such as strawberry or peach.

It has been found that pectin which has been methylated to a high degree without depolymerization has the aforementioned desirable properties of gel formation when the pectin preparation is marketed in a liquid form. It has also been found that pectin which has been methylated to a somewhat lower degree without depolymerization has these aforementioned desirable properties when the pectin preparation is marketed in a dry form. Since natural plant pectin as obtained from existing processes may have an undesirably low degree of methylation, it is desirable that this process consistently and economically methylate pectin to provide these desirable properties regardless of source, time of harvest, or variation of seasons.

According to the present invention, when pectin is methylated under mild conditions, which substantially avoid depolymerization of the pectin molecule, the optimum grade of the pectin will rise to a maximum up to a certain degree of methylation. It has also been found that upon further methylation, under mild conditions avoiding depolymerization, to a higher degree than that at which the maximum grade is obtained, the pectin can be stored in an acidulated solution, and although it will demethylate on storage it will increase in grade. This increase in grade will continue upon demethylation to a point approximating that at which the maximum grade is obtained upon methylation. It has further been found that when the pectin is methylated under the aforementioned mild conditions in the form of a precipitated pectin gel, the increase in grade upon methylation is much higher than in cases when the pectin is methylated in any other form and will reach a maximum grade at a degree of methylation in the neighborhood of 72–74 D.M. Likewise, it has been found that on continued methylation to as high as 84 D.M., the pectin on storage in the acidulated solution will increase in grade upon demethylation to a maximum at a D.M. of about 73–75 D.M. The magnitude of the maximum grade attained upon demethylation is substantially the same as that attained by methylation.

With regard to the aforesaid dry form of pectin which is marketed in a dry mix also containing essentially an edible food acid and sugars, it has been discovered that when a precipitated pectin gel is methylated under conditions that substantially avoid depolymerization of the pectin molecule, a number of advantages occur. Plant pectin as it exists in nature has a varying degree of methylation which is both unpredictable and uncontrollable as indicated above, and has a number of optimum grades at various jelly pH's depending upon its degree of methylation. Because of such natural variations in degrees of methylation is it not possible to provide the domestic user of the dry mix the benefit of an optimal gel strength without varying the amount of acid in the package, and even then it is not possible to achieve acceptable optimal gel strength for various fruit jams and jellies due to the excessive tartness resulting in many cases. On the other hand, when pectin is methylated while in the form of a precipitated pectin gel, a substantially uniform degree of methylation is achieved and there is also provided a very substantial increase in its grade such that the amount of edible acid employed in the package may be fixed at a level that produces for the domestic user recipes which, on the average, are much closer to the optimum pH of the improved pectin for various fruits. The housewife is thereby provided with a dry mix package capable of producing a more uniform grade from a lesser amount of pectin and capable of producing a more uniform result in product recipes.

Furthermore, unmethylated plant pectin occurring at a relatively low D.M. has an optimum jelly pH that is quite low. At pH's above the optimum jelly pH, the grade values decline sharply. When the domestic user prepares a jelly from a fruit naturally deficient in acid, such as peach, the jelly pH is frequently much higher than the optimum jelly pH for such pectin so that its gel strength is low and the recipe may fail to produce an acceptable jam or jelly. The same pectin, methylated from a precipitated gel form to the aforesaid degree in accordance with the present invention, has both a substantial rise in its optimum pH and a much broader range for optimal jelly strength with various fruits of high and low acidity, the grade values decreasing more slowly as acidity increases. The housewife is therefore provided with a dry mix effective over a wider fruit acid range.

Another advantage of pectin to be marketed in a dry form and methylated in accordance with the present invention is its greater grade stability resulting in a longer shelf life.

Furthermore, the solubility of pectin methylated in accordance with the present invention is considerably improved. Unmethylated pectin, depending on the fruit, the season and the time of season, is frequently found to have a varying degree of solubility in fruit juice when added thereto in the form of a dry mix. Such partial insolubility reduces the eventual strength which a jelly can attain and pectin is visible as tiny transparent swollen particles in the jelly. Pectins that are methylated as indicated herein from the precipitated gel form have uniformly been found to be of high and satisfactory solubility when included in a dry mix which is added to fruit juice.

It has also been found that pectin, regardless of original degree of methylation and source, can best be economically and consistently methylated in accordance with the present invention when it is precipitated from pectin liquor in the form of a hydrated gel which preferably is shaped and sized and which will retain said shape and size during the methylation process that follows. The pectin gel is preferably precipitated from a clarified pectin liquor in order that the eventual methylated pectin will produce clear jellies. This pectin gel is methylated by means of methyl alcohol in the presence of an acid catalyst such as sulfuric or hydrochloric acid at an average rate of methylation which avoids substantial degradation of the pectin molecule. In the present process this rate will vary from a relatively high initial rate of methylation to a relatively low final rate of methylation. In each methylating process this rate of methylation will vary in accordance with concentration of the methyl alcohol, the acid catalyst, and the water in the methylating reagent as well as with the temperature of the reagent and for any given set of methylating conditions pectin will have an "equilibrium D.M." which cannot be exceeded but which will be approached rapidly in the early stages of methylation and more slowly in the late stages of methylation.

Under a given set of methylating conditions the rate of methylation is also higher the lower the initial D.M. of the pectin. Such conditions may be expressed as the rate or D.M. rise per hour and especially as the rise in D.M. during the first hour since this initial rate influences the subsequent rate of methylation. Preferably the rise during the first hour should not exceed 10 D.M. points. The higher the initial D.M. of the pectin, the lower the preferred initial rate of methylation. For example, when methylating from an original D.M. of 60, during the first hour the rise in D.M. should not exceed 8.3 D.M., from a D.M. of 65 the rise in D.M. should not exceed 7.1 D.M. during the first hour, and from a D.M. of 70 the rise in D.M. should not exceed 6.2 during the first hour over a total D.M. range for methylation of 60–85 D.M. When the total range for methylation is from 60–75 D.M. (where the pectin is to be marketed in the dry form), from an original D.M. of 60, during the first hour the rise in D.M. should preferably not exceed 4.3 D.M., from an original D.M. of 65, during the first hour the rise in D.M. should preferably not exceed 2.6 D.M., and from an original D.M. of 70, during the first hour the rise in D.M. should preferably not exceed 1.9 D.M.

The results stemming from the present process when employing the preferred shaped and sized precipitated pectin gel are unexpected, as will be pointed out hereinafter. In general, the necessary and desirable methylation process is accomplished under mild conditions but at a relatively high rate of methylation and unexpectedly in a relatively short total processing period. Moreover, methylation can be accomplished within predictable limits of time and regardless of the initial D.M. of the pectin. The extent to which these results are unexpected will be appreciated when it is considered that ordinary dry pectin cannot be methylated at the aforementioned rate without substantially degrading the pectin. Thus, the necessary form of pectin to be methylated, i.e., the precipitated hydrous pectin gel, can be methylated in the presence of an acid catalyst at rapid rate.

The pectin is precipitated after the pectin liquor is extracted from its cellulosic source material by known methods. The pectin may be precipitated by the use of an alcohol such as methanol, or a metal precipitating agent such as aluminum, copper, iron, zinc, chromium and the like as well as mixtures of such metal precipitating agents. The gel curds formed by such precipitation are pressed to a relatively high solids content. As a result, the gel curds of pectin precipitate are readily shaped and sized and still retain their shape when subsequently methylated. Preferably, these gel curds are pressed to a solids content of 10–15% and most preferably 11–13%. However, the invention is not to be considered as restricted to any preferred level of solids content since like improvements in pectin gel characteristics and uniformity will be achieved in all cases where a precipitated hydrous form of pectin for reaction with methylating reagent is created. Thus in the case of an alcohol precipitated pectin gel, such gel can be effectively dispersed with respect to the methylating agent and will be more amenable for penetration of the reagent in a more rapid and uniform manner which represents a distinct improvement over results obtained when dry pectin powders are similarly treated.

The pectin liquor is obtained by various means well known in the art such as by comminuting the desired pectin source material, i.e., citrus peel, washing the comminuted peel, and then extracting the pectin, followed by filtration and clarification. In accordance with this process the pH of most pectin liquors will be adjusted with suitable alkali to a pH of 2.0 to 3.0 and preferably in the case where a metal precipitating agent is to be used to a pH of about 2.5. Thereafter the adjusted pectin liquor is treated with a precipitating alcohol or soluble precipitating metal salt, such as aluminum, or mixtures of such metal salts as aluminum and copper, i.e., aluminum sulfate and copper sulfate. In cases where aluminum sulfate $Al_2(SO_4)_3.14H_2O$ and copper sulfate $CuSO_4.5H_2O$ are employed as a mixture of precipitating agents, the ratio of aluminum salt to copper salt should preferably be between 10:0.75 and 10:1.00, an optimum ratio being 10:0.85. Also, the pectin content of the liquor should be in the order of 0.25–0.50% and preferably 0.37% and be maintained at a temperature of 110°–130° F., and preferably 120°–125° F. After addition of the precipitating salt or mixture of precipitating salts a second and constant amount of alkali is added to give a final and constant pH in the precipitating mixture in the neighborhood of 3.9–4.0 in the mother liquor at 77° F. The result is a pectin gel curd which can be readily pressed to the aforementioned desired solids content.

The methylating procedure of the present invention is preferably preceded in the case of a metal precipitating agent by a washing of the shaped and sized pectin gel to remove excess metal which is present in pectin complex form as well as other impurities which are dissolved in the free mother liquor retained in the shaped pectin gel. This impurity is in the order of 20–25% of the solids of the pressed pectin gel and includes in addition to the precipitating agent attached to the pectin molecules, and dissolved in the free mother liquor, inherent soluble salts such as sodium sulfate and citrate, silicon, iron and magnesium, bound to the pectin and organic impurities such as coloring matter, sugars, citrate, iron hesparidin, polysaccharides, and the like. The wash liquors quickly diffuse into and through the watery pectin gel.

Preferably, in the case of the metal precipitating pectin gel, the pressed pectin gel is washed using an acidulated methanol solution of such strength and temperature that washing out of impurity and slight partial methylation take place simultaneously. Thus, the degree of methylation may rise 2.5 D.M. during the washing step. The wash liquor may consist of drains from subsequent steps such as spent methylation reagent. The sized gel is quickly drained free of wash liquor and is preferably rewashed with additional wash liquor. The alcohol and acid in the wash liquor diffuse into the gel while water, metal salts and organic impurities therein diffuse out and a condition of equilibrium is quickly reached wherein the gel shrinks but its permeability to methylating reagent in subsequent operations remains very high and no impermeable coating or barrier is present on the surface of the sized gel.

Thereafter, the washed and sized pectin gel is methylated under conditions wherein methylation takes place at the rate heretofore described, the final degree of methylation being based upon the desired end use of the pectin. In general, degrees of methylation in the order of 10–12 points can be accomplished in 4–6 hours but even higher increases in points of D.M. have been obtained where the original plant pectin has an abnormally low original degree of methylation, such as about 60 D.M., or where it is desired to obtain abnormally high final D.M.'s, in the order of 85–90 D.M.

The common advantages stemming from the aforementioned ranges of methylation are uniform and consistent processing results in the final pectin product in a short period of time under controllable conditions with a high degree of economy in the methylating reagent employed. There are three primary controllable factors in methylating the pectin gel in the present invention. The major factor is the "water ratio," i.e., the weight ratio of water to the sum of methanol and water. The lower the water ratio the faster the rate of methylation, although too low a ratio may result in an undesirable processing rate. Acid concentration is also important and the higher the concentration of the acid, the faster the rate of methylation. In general, for the major methylating step after the liquor in the pectin gel has come to equilibrium with the methylating reagent, the water ratio may range from 0.050–0.260 and the acid (sulphuric) concentration in the reagent from 4.5 to 17.0% weight, at 50–100° F. with an original D.M. above 60. As the temperature increases, the rate of methylation increases rapidly and the preferred temperature of methylating reagent during methylation should be between 50–100° F., and most preferably 80–90° F. Above 100° F. the methylating reagent would be too severe and may result in degradation of the pectin with reduction in grade. At 80° F. a water ratio of 0.132 and a concentration of sulphuric acid at 11.9% by weight provides an average rate of methylation of about 2.2 D.M. points per hour over a period of 4–6 hours with an original D.M. of about 70. On the other hand, a water ratio of 0.176 and a sulphuric acid concentration of 8.9% by weight provides a rate of methylation of about 0.7 D.M. points per hour over a period of 4–6 hours.

Other acidulating agents such as hydrochloric acid may be employed, but sulfuric acid is preferred.

After methylation, the pectin is washed by rinsing away impurities and the acid used during methylation. Thereafter, the methylated pectinic acid gel is partly neutralized to convert the pectinic acid to sodium acid pectinate and to neutralize any residual acid such as sulfuric acid. The drained liquors from neutralization can be employed as rinse liquors after methylation and thus include a dilute neutral alcohol containing a small amount of sulfates that are formed during neutralization. The rinses serve to purify the pectinic acid resulting from methylation and reduce the sulfuric acid to a very small content which is substantially removed in the later neutralization step by employing a suitable alkali, preferably soda ash or ammonium hydroxide or calcium carbonate.

It should be pointed out that throughout the aforementioned washing, methylating, rinsing and neutralization the sized pectin gel substantially retains its shape such that it can be readily pumped without any substantial disintegration and dried and milled in suitable apparatus.

Whereas the original high solids pectin gel, that is, the pressed gel curd having a solids content of 11–13%, contains about 75–80% metal free pectinic acid, this invention is not to be restricted to such a high solids content inasmuch as a partially pressed pectin gel curd having a solids content of around 6.0% solids can also be shaped and sized and methylated under the aforementioned conditions to produce a pectin having an improved grade and jellifying characteristics. The aforesaid high solids content of above 10% and between 11–13% is preferred inasmuch as a thoroughly pressed gel or shred is more susceptible to shaping and sizing and is firmer and stronger, such that it does not disintegrate during washing of the impurities from the pressed gel and during methylation.

The advantages stemming from the use of the presently preferred process will be appreciated when it is considered that attempts at methylating dry pectin powder from 70 D.M. to 81.5 D.M. required an average of about 10 times the methylating period under the same methylating conditions and does not achieve any substantial increase in grade from that which originally prevailed.

One procedure for practicing the present invention is as follows: A clarified pectin extract or liquor from Valencia orange peel containing 0.37% pectin besides the aforementioned fruit extractives at a temperature of 120°–125° F. and under turbulent agitation which is continued through the following precipitation step is brought to a standard constant pH with a sodium carbonate (soda ash) solution containing 169.6 gms. sodium carbonate per liter of solution. A sufficient amount of this soda ash solution is added to give a constant pH of 2.50 at 120° F. Thereafter, the metal salt precipitating solution containing copper sulfate and aluminum sulfate is added, 1 liter of the metal salt solution containing 540 gms. aluminum sulfate and 45.9 gms. copper sulfate. 1.75% of this metal salts solution by volume of the original unadjusted pectin liquor is then added during a period of about 1 minute. Immediately thereafter 1.05% of the aforementioned soda ash solution by volume of the original unadjusted pectin liquor is added and stirred for about 15 seconds whereupon a pectin aluminum copper complex separates throughout the liquor as an extremely finely divided continuous gel which immediately coagulates into curds and rises to occupy about a quarter of the liquor volume, the final optimum pH of the mother liquor being 3.9–4.0 at 77° F.

The mother liquor is drained away and the coagulated gel is collected and drained on a screen and pumped to an Ireland roll press which presses out more clear liquor and raises the gel solids from about 2.5 to about 6.5%. A second pressing operation follows to squeeze out more clear liquor and raise the solids to 11–13%. Thereafter the pressed gel is extruded through the die of a screw-type extruder which sizes and shapes the gel into thin cylinders about ¼ to ¾" long and about 1/16" in diameter.

6070 lbs. of the sized and shaped pectin gel containing 11% solids and 8.5 pectin as pectinic acid are allowed to drop as formed into 14,390 lbs. of a first wash liquor containing 8.0% weight sulphuric acid and 64.4% weight methanol. After all the formed gel has been added to the wash liquor, the slurry is stirred 15 minutes at about 80° F. The liquor is drained off and the gel is then treated with 7950 lbs. of a second wash liquor containing 10.8% weight sulphuric acid and 70.4% weight methanol. The slurry is again stirred 15 minutes and the liquor drained off. The gel is then treated with 7580 lbs. of a third wash liquor containing 11.9% weight sulphuric and 75.8% weight methanol. The slurry is again stirred for 15 minutes and the liquor drained off. During the washing steps the D.M. of the pectin gel rises from 68.5 to 70.0; also, during the washing steps the sized and shaped pectin gel complex shrinks but retains high permeability to all the liquors.

The pectin gel is then treated with 7200 lbs. of a methylating reagent containing 13.5% weight sulfuric acid and 78.5% weight methanol. The methylating reagent is added at about 95° F. in order to raise the temperature of the mixture to about 90° F. The slurry is stirred 15 minutes and allowed to stand 5 hours. The D.M. was then 81.5. The spent methylating reagent is then drained off quickly and the gel is treated at once with 6110 lbs. of a first rinse liquor containing 3.7% weight sulfuric acid and 65.3% weight methanol. The slurry is stirred 15 minutes and the liquor drained off. The gel is then treated with 6240 lbs. of a second rinse liquor containing 1.82% weight sulfuric acid and 63.0% methanol. The slurry is stirred 15 minutes and the liquor drained off. The gel is then treated with 6380 lbs. of a third rinse liquor containing 0.7% sulfuric acid and 61.9% methanol. The slurry is stirred 15 minutes and the liquor drained off. The gel is then treated with 6520 lbs. of a fourth rinse liquor containing 0.1% weight sulfuric acid and 60.0% methanol. The slurry is stirred 15 minutes and the liquor drained off. The drained rinsed gel then consists of sized cylinders of pectinic acid of 81.5 D.M. which contain a liquor of low sulfuric acid content and 61.0% methanol. The residual sulfuric acid is neutralized and the pectinic acid in this gel is partly neutralized in the following way to an acid sodium pectinate (pectin). The gel is treated with 6520 lbs. of a neutralizing liquor containing 44 lbs. soda ash and 3920 lbs. methanol and 2556 lbs. water. The slurry is stirred for 30 minutes and pumped onto a vibrating screen. From there the drained pectin gel is transferred to a vacuum rotary dryer. The pectin is vacuum dried until the methanol is driven off and the moisture is reduced to about 10%. The dried pectin is transferred to a hammer type mill and milled to a powder.

In the example just described the methylation reagent and the neutralization liquor are made up fresh for each methylation batch. The wash liquors consist of the spent methylation liquor from a previous batch, used countercurrent, first in the third wash, then in the second wash, while the spent second liquor combined with a spent first rinse becomes the first wash liquor. Similarly, the fourth rinse consists of spent neutralization liquor from a previous batch and so on.

In lieu of the foregoing operative example employing aluminum and copper salts the following procedure may be employed wherein aluminum chloride is the sole metal precipitating agent. One thousand gallons of pectin extract or liquor from lemon peel containing 0.37% pectin besides the aforementioned fruit extractives at a temperature of 120°–125° F. is maintained under turbulent agitation through the following precipitation step. The metal precipitating salt solution containing 367 pounds aluminum chloride ($AlCl_3 \cdot 6H_2O$) in 100 gallons of solution is added. 1.75% of this metal salt solution by volume of the original pectin liquor is added during a period of about 1 minute. Immediately thereafter about 32.5 gallons of soda ash solution containing 140 pounds $Na_2CO_3$ in 100 gallons of solution is added whereupon a pectin-aluminum complex separates throughout the liquor as an extremely finely divided continuous gel which immediately coagulates into curds and rises to occupy about one quarter of the liquor volume, the final optimum pH of the mother liquor being 3.8–4.0 at 77° F.

Thereafter the precipitated pectin gel is pressed washed, and methylated in the same manner as the previous example.

The rise and fall in optimum grade during methylation in accordance with process of the preceding specific examples are as follows. The optimum grade of the pectin first rises and then falls when the pectin is methylated from a D.M. of around 65 to a D.M. around 81. The average rise in optimum grade is about 21% from an original grade of about 260 to a maximum of about 315 in methylating from 65 to 73 D.M. The optimum grade then falls about 82 grade points from 315 to about 233 when the pectin is further methylated to 81 D.M.

The pectin can be employed in an acidulated and buffered aqueous solution, which when stored at ordinary temperatures demethylates by reason of the presence of the acid. The composition of this pectin solution is as follows: 3.3 parts hydrated dextrose, 0.49 parts potassium citrate, 0.83 parts anhydrous citric acid, 1.84 parts pectin (81.5 D.M.), 1.13 parts lactic acid, 92.41 parts by weight water. The actual pectin content is determined by the amount required to provide the pectin solution with a grade of not less than 3.25 after storage for 8 weeks at 110° F.

Unexpectedly it has been found that the pectin upon demethylation essentially retraces its grade history in that upon demethylation to about 73–75 D.M. the pectin increases in optimum grade and thereafter decreases in grade below a D.M. of 72. It should be noted that this demethylation occurs over a period of years at normal storage temperatures and has a shelf life at least 50% longer than similar pectin solutions made from unmethylated pectin. Advantageously, this pectin also has a high tolerance to a decrease in the amount of soluble solids employed by the housewife in jams and jellies over that of previous unmethylated pectins in obtaining adequate gel strength despite natural high degrees of methylation in such previous pectins. Advantageously also, the pectin of the present invention has a lower viscosity than previous pectins of equivalent grade and gel strength such that the pectin can be employed in a more concentrated liquid form in the aforementioned acidulated pectin solution while at the same time providing substantially the same gelling capacity in a smaller volume.

In the case of a product to be marketed in the dry form and in which the original D.M. pectin gel is 68.5 and in which the desired D.M. is 74, a preferred procedure for washing and methylating the pectin gel is as follows. About 6070 lls. of the sized and shaped pectin gel containing 11% solids and 8.5% pectin as pectinic acid are allowed to drop as formed into 14,650 lbs. of a first wash liquor containing 5.55% weight sulfuric acid and 68.6% weight methanol. After all the formed gel has been added to the wash liquor, the slurry is stirred 15 minutes at about 70° F. The liquor is drained off and the gel is then treated with 7450 lbs. of a second wash liquor at about 70° F. containing 8.00% weight sulfuric acid and 75.4% weight methanol. The slurry is again stirred 15 minutes and the liquor drained off. Under these conditions little or no methylation will take place during the first and second washes. During the washing steps the sized and shaped pectin gel complex shrinks but retains high permeability to all the liquors.

The pectin gel is then treated with 7100 lbs. of a methylating reagent containing 8.93% weight sulfuric acid and 81.4% weight methanol. During methylation the temperature of the mixture is kept at about 90° F. The slurry is stirred 15 minutes and allowed to stand 4.5 hours. The D.M. was then 74.0. The spent methylating reagent is then drained off quickly and the gel is treated at once with 6450 lbs. of a first rinse liquor containing 2.37% weight sulfuric acid and 71.6% weight methanol. The slurry is stirred 15 minutes and the liquor is drained off. The gel is then treated with 6490 lbs. of a second rinse liquor containing 1.15% weight sulfuric acid and 70.9% weight methanol. The slurry is stirred 15 minutes and the liquor is drained off. The gel is then treated with 6520 lbs. of a third rinse liquor containing 0.43% weight sulfuric acid and 70.2% weight methanol. The slurry is stirred 15 minutes and the liquor drained off. The gel is then treated with 6550 lbs. of a fourth rinse liquor containing little or no sulfuric acid and 70.0% weight methanol. The slurry is stirred 15 minutes and the liquor is drained off. The drained rinsed gel then consists of sized cylinders of pectinic acid of 74.0 D.M. which contain a liquor of low sulfuric acid content and 70.2% weight methanol. The residual sulfuric acid is neutralized and the pectinic acid in this gel is partly neutralized in the following way to an acid sodium pectinate (pectin). The gel is treated with 8160 lbs. of a neutralizing liquor containing 30.4 lbs. soda ash and 5697 lbs. methanol and 2433 lbs. water. The slurry is stirred for 30 minutes and pumped onto a vibrating screen. From there the drained pectin gel is transferred to a vacuum rotary dryer. The pectin is vacuum dried until the methanol is driven off and the moisture is reduced to about 10%. The dried pectin is transferred to a hammer type mill and milled to a powder.

In the examples just described the methylation reagent and the neutralization liquor are made up fresh for each methylation batch. The wash liquors consist of the spent methylation liquor from a previous batch, used countercurrent, first in the second wash, while the spent second wash liquor combined with the spent first rinse liquor becomes the first wash liquor. Similarly, the fourth rinse consists of spent neutralization liquor from a previous batch and so on.

The pectin can be employed in a dry mix consisting essentially of pectin, an edible acid and sugars. The composition of this mix is as follows: Pectin (74 D.M., 10% moisture) 4.77 parts, citric acid anhydrous 7.08 parts, dextrose hydrate 88.19 parts by weight. The actual pectin content is determined by the amount required to provide the pectin mixture with a grade of 13.0 at a jelly pH of 3.15, 62.5% solids and containing the normal fruit salts and acids. This dry mix when added to fruit juice or pulped fruit and brought to a boil dissolves completely and when a given quantity of sugar is added to the boiling mixture and dissolved by boiling; the solution can be poured into containers whereupon a jelly forms. The pectin contained in the aforesaid dry mix permits less pectin and edible acid to be employed than heretofore, has a greater grade stability and shelf life, and produces jams and jellies of higher average strength and greater uniformity of strength and setting time over a wider range of recipe pH's (in order of 2.9–3.3) than previous pectins.

While the foregoing examples deal mainly with the preparation of a precipitating pectin gel using a metal precipitating agent the invention in its broadest aspect contemplates use of other means than a metal salt such as aluminum to precipitate a hydrous form of pectin. Thus though pectin may be precipitated by the use of a metal in the manner taught by Leo et al. in U.S. Patent No. 2,392,854, issued January 15, 1946, Patent 2,703,758 and Patent 2,703,759, issued March 8, 1955; other processes may be used to precipitate the pectin, such as the alcohol or acetone precipitation disclosed in U.S. Patent No. 2,478,170 to Maclay et al., issued August 9, 1949. The precipitated gel of hydrous pectin may then be subjected to the influences of a methylating reagent in the same manner previously indicated in connection with the treatment of a metal precipitated pectin.

Although the benefits of the present invention are most advantageously derived when employing pectinous raw materials having a D.M lower than 72 which low D.M. pectins have relatively poor jelly making characteristics, other pectins having a D.M. higher than 72 may also be employed. In all cases methylation may proceed at a rate dependent upon the ultimate form of pectin to be marketed, to as high a degree of methylation as desired. In the case of pectins having a D.M. above 72 the methylated pectins will demethylate on storage but increase in grade upon demethylation in a similar manner to the lower D.M. pectins. Thus it is within the purview of the present invention that such forms of citrus pectin high in original D.M., and above 72 D.M., may be advantageously methylated either by a precipitating agent or an alcohol.

This application is a continuation-in-part application of co-pending application Serial No. 74,215, now abandoned, filed December 7, 1960; which is a continuation of application Serial No. 571,590, filed March 15, 1956, now abandoned; which was a continuation-in-part of application Serial No. 517,093, filed June 21, 1955, now abandoned.

It will be understood that while the invention has been described in part by means of specific examples reference should be had to the appended claims for a definition of the scope of the invention.

What is claimed is:

1. A process for producing pectin of improved jelly making characteristics which comprises methylating pectin having a D.M. below 72 by introducing it in the form of a precipitated pectin gel directly into an acidulated methanol solution under conditions of acid and methanol concentration and temperature such that the rise in D.M. points during the first hour of methylation does not exceed 10 D.M. points.

2. A process for producing pectin of improved jelly making characteristics which comprises methylating the pectin by introducing it in the form of a precipitated pectin gel directly into an acidulated methanol solution under conditions of acid and methanol concentration and temperature such that the rise in D.M. points during the first hour of methylation does not exceed 8.3 to 7.1 to 6.2 D.M. points for pectins having original D.M.'s, ranging from 60 to 65 to 70 D.M., respectively.

3. A process for producing pectin of improved jelly making characteristics which comprises methylating the pectin by introducing it in the form of a precipitated pectin gel directly into an acidulated methanol solution under conditions of acid and methanol concentration and temperature such that the rise in D.M. points during the first hour of methylation does not exceed 4.3 to 2.6 to 1.9 D.M. points for pectins having original D.M.'s ranging from 60 to 65 to 70 D.M., respectively.

4. A process for producing pectin of improved jelly making characteristics as defined in claim 3 wherein sulfuric acid is used to acidulate the methanol solution.

5. A process for producing pectin of improved jelly making characteristics which comprises reacting a pectin liquor with a metal precipitating agent to precipitate the pectin as gel curds, pressing the gel curds to increase the pectin solids therein to 6–15% by weight of the curds, and methylating the pressed pectin gel curds by introducing them directly into an acidulated methanol solution under conditions of acid and methanol concentration and temperature such that the rise in D.M. points during the first hour of methylation does not exceed 10 D.M. points, the original D.M. of the pectin prior to methylation being below 72 and the pectin being methylated to a D.M. of 81 to 82.

6. A process for producing pectin of improved jelly making characteristics as defined in claim 5 including the step of forming the pressed gel curds into pellets, and methylating the pellets of pressed pectin gel curds by introducing them directly into said acidulated methanol solution.

7. A process for producing pectin of improved jelly making characteristics which comprises reacting a pectin liquor with a metal precipitating agent to precipitate the pectin as gel curds, pressing the gel curds to increase the pectin solids therein to 10–15% by weight of the curds and forming the pressed gel curds into pellets, washing said pellets in an acidulated methanol solution to wash out impurities and methylate said pellets slightly whereby the pellets of pectin gel curds shrink but their permeability to methylating reagent remains, and thereafter methylating said washed pellets of pectin gel curds by introducing them directly into an acidulated methanol solution under conditions of acid and methanol concentration and temperature such that the rise in D.M. points during the first hour of methylation does not exceed 10 D.M. points, the original D.M. of the pectin prior to methylation being below 72 and the pectin being methylated to a D.M. of at least 72.

8. A process for producing pectin of improved jelly making characteristics which comprises methylating pectin having a D.M. between 60 and 72 by introducing it in the form of a precipitated pectin gel directly into a sulfuric acid-methanol solution under conditions of acid and methanol concentration and temperature such that the rise in D.M. points during the first hour of methylation does not exceed 10 D.M. points, said solution having a weight ratio of water to the sum of methanol and water ranging from 0.050 to 0.260 and an acid concentration ranging from 4.5–17.0% by weight, the temperature of said solution ranging from 50°–100° F.

9. A process for producing pectin of improved jelly making characteristics which comprises methylating pectin having a D.M. of about 70 by introducing it in the form of a precipitated pectin gel directly into a sulfuric acid methanol solution under conditions of acid and methanol concentration and temperature such that the rise in D.M. points during the first hour of methylation does not exceed 10 D. M. points, said solution having a weight ratio of water to the sum of methanol and water ranging from 0.132 to 0.176 and an acid concentration ranging from 8.9–11.9% by weight, the temperature of said solution being about 80° F.

10. A methylated pectin of improved jelly making characteristics which is not depolymerized after methylation, has a higher jelly grade and higher optimum jelly pH than natural pectins of corresponding D.M. and is produced by introducing the pectin in the form of a precipitated pectin gel directly into an acidulated methanol solution under mild conditions of acid and methanol concentration and temperature producing a rise in D.M. points during the first hour of methylation not exceeding 10 D.M. points.

11. A process for producing pectin of improved jelly making characteristics which comprises reacting a pectin liquor with an aluminum salt to precipitate an aluminum pectin gel complex, pressing said pectin gel complex to a pectin solids concentration of 6–15% by weight of the gel complex, and methylating the gel complex in an acidulated methanol solution under conditions which substantially avoid depolymerization of the pectin, by limiting the rate of methylation so that the rise in D.M. points does not exceed 10 D.M. points during the first hour of methylation, the original D.M. of the pectin prior to methylation being below 72 and the pectin being methylated to a D.M. of at least 72.

12. A process for producing pectin of improved jelly making characteristics which comprises reacting a pectin liquor with copper and aluminum salts to precipitate a copper aluminum pectin gel complex, pressing said pectin gel complex to a pectin solids concentration of 6–15% by weight of the gel complex, and methylating the gel complex in an acidulated methanol solution under conditions which substantially avoid depolymerization of the pectin, by limiting the rate of methylation so that the rise in D.M. points does not exceed 10 D.M. points during the first hour of methylation, the original D.M. of the pectin prior to methylation being below 72 and the pectin being methylated to a D.M. of at least 72.

13. A process for producing pectin of improved jelly making characteristics which comprises adjusting a pectin liquor to a pH of 2.2 to 2.8 at 120° F. adding a mixture of copper and aluminum salts to the adjusted pectin liquor and adjusting the pH thereof to the neighborhood of 3.9–4.0 at 77° F. to precipitate a pectin gel curd, pressing the pectin gel curd to a pectin solids concentration of 6–15% by weight of the curd, and methylating the pressed gel curd in an acidulated methanol solution under conditions such that the rise in D.M. points does not exceed 10 D.M. points during the first hour of methylation, the original D.M. of the pectin prior to methylation being below 72 and the pectin being methylated to a D.M. of at least 72.

14. The process of claim 13 wherein the ratio of aluminum salt to copper salt is equivalent to a ratio of 10:0.75 to 10:1.00 where the salts are sulphates.

15. The process of claim 13 wherein the pressed pectin gel curd is washed with an acidulated methanol solution resulting in a rise in D.M. prior to subsequent methylation.

References Cited in the file of this patent

UNITED STATES PATENTS

| | | |
|---|---|---|
| 2,392,854 | Leo et al. | Jan. 15, 1946 |
| 2,703,758 | Leo et al. | Mar. 8, 1955 |
| 2,703,759 | Leo et al. | Mar. 8, 1955 |

OTHER REFERENCES

Hinton: "Fruit Pectins," published by His Majesty's Stationery Office (London), 1939, pages 64 to 68 relied upon.

Jansen et al.: "J.A.C.S.," vol. 68, 1946, pages 1475–1477.